Nov. 18, 1958     L. A. KOLENDA ET AL     2,860,367
SUCTION NOZZLE FOR CLEANING HARD SURFACES
Filed Aug. 19, 1953
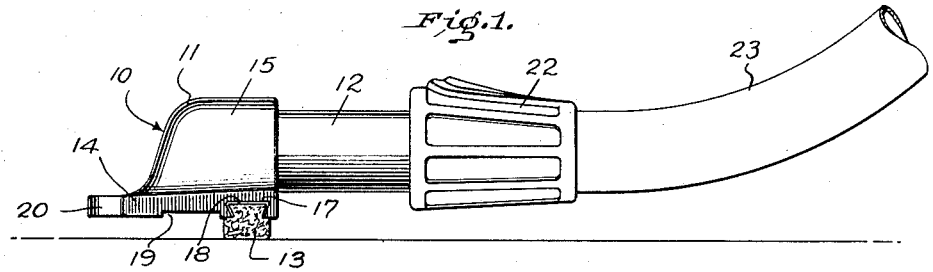
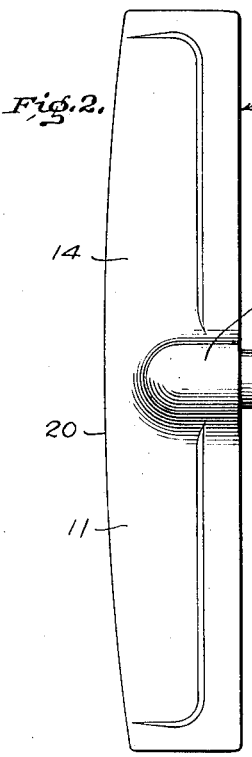
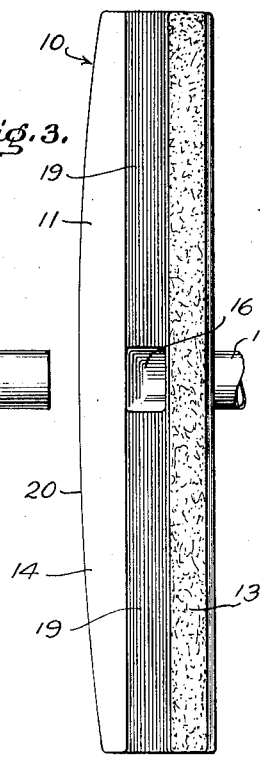
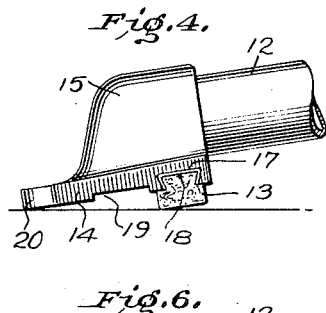
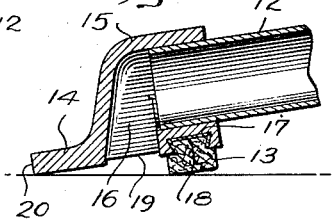
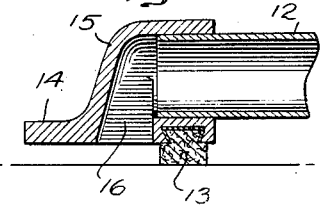
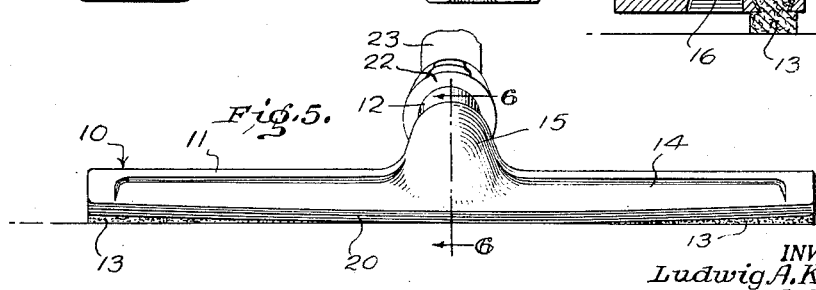
INVENTORS
Ludwig A. Kolenda,
John F. Kolenda and
Ernest A. Kolenda
BY Reginald W. Hoagland
ATTORNEY

United States Patent Office 2,860,367
Patented Nov. 18, 1958

2,860,367

SUCTION NOZZLE FOR CLEANING HARD SURFACES

Ludwig A. Kolenda, John F. Kolenda, and Ernest A. Kolenda, Clio, Mich.

Application August 19, 1953, Serial No. 375,185

1 Claim. (Cl. 15—393)

This invention relates to suction cleaner nozzles and, more particularly, to nozzles for use in cleaning hard surface floors.

An object of the invention is to provide a nozzle with a floor wiping element fixed rearwardly to the underside thereof and resting on the floor for supporting the nozzle above and rockable relative to the floor, thereby permitting the forward portion of the nozzle to be elevated and passed over large particles of rubbish that are subsequently engaged and pushed forward by the wiper element until removed from the floor by suction.

Another object of the invention is to provide a nozzle as outlined above wherein the nozzle is in the form of a transversely elongated flat plate having a substantially flat and unobstructed undersurface with a suction duct opening to said undersurface at a location substantially midway of the length of said plate, and directly in advance of the wiper element, thus providing a construction that permits increasing and decreasing of suction power at opposite ends of the nozzle by simply rocking the intermediate portion of the nozzle on the wiper element to vary the size of air inlet space between the forward edge of the plate and the floor.

A further object of the invention is to provide a nozzle as previously set forth wherein the forward edge of the elongated plate is gradually advanced forwardly of both of its end portions, thereby causing said intermediate portions adjacent the suction duct opening to be in closer proximity to the floor than the remainder of the forward edge upon tilting the forward edge toward the floor, which tends to equalize the suction power under the entire forward edge of the nozzle.

A still further object of the invention is to provide a nozzle in accordance with the preceding object wherein the volume of air entering under the nozzle when tipped down to contact the intermediate portion of its forward edge with the floor is concentrated at the end of the nozzle and is substantially equal to the volume of air in the suction duct.

It is also an object of the invention to provide a nozzle of the above-indicated character which is simple and substantial in construction, economical to manufacture, and thoroughly efficient and practical in use.

Other objects and advantages of the invention will become apparent from the description hereinafter following and the drawings forming a part thereof, in which Figure 1 is a side elevation of the improved nozzle shown attached to a tubular handle;

Figure 2 is a top plan view of the nozzle;

Figure 3 is a bottom plan of same;

Figure 4 is also a side elevation of the nozzle showing it tilted forwardly;

Figure 5 is a front elevation with the nozzle in the same position shown in Figure 4;

Figure 6 is a vertical section on line 6—6 of Figure 5; and

Figure 7 is a similar vertical section with the nozzle positioned on a horizontal plane, and showing a slight modification.

Referring now more specifically to the accompanying drawings wherein like numerals designate similar parts throughout the various views, the numeral 10 indicates generally the improved nozzle which is chiefly composed of three elements—a casting 11, a tube 12, and a wiper 13. The casting 11 is of aluminum or other similar lightweight material and is of a shape providing a transversely elongated and substantially rectangular plate 14 having a substantially flat unobstructed undersurface and a raised boss 15 on its upper surface midway of its length through which a suction duct 16 extends. One end of the suction duct 16 is substantially rectangular in cross section, extends downwardly, and opens on the flat undersurface of the plate 11 approximately midway between the forward and rear edges and opposite ends of the plate. The other end of the duct 16 is cylindrical in cross section, opens to the rear of the boss 15 and has secured therein, preferably by a forced fit, one end of the tube 12.

Throughout the length of the elongated plate 11 directly in rear of the rectangular end of the duct 16, and opening on the substantially flat and unobstructed undersurface of said plate is a dovetailed groove 17 into which is slid and frictionally supported the wiper 13. The wiper 13 extends the full length of the plate 14 and has fixed thereon a thin metal strip 18 bent to a shape whereby the outer surface thereof conforms substantially to the size and shape of the dovetailed groove 17 for providing the above-mentioned slidably removable and frictionally supported wiper. The wiper is made of felt or other yieldable material with a shape rectangular in cross section below the undersurface of the plate 11 and is of sufficient stiffness that it supports said plate spaced above the floor while said wiper is slid over the surface of the floor. The distance the wiper 13 projects below the plate 11 is proportional to the width of said plate so as to permit convenient varying of the distance of the forward edge of the plate toward and away from the surface of the floor upon slight tipping of the nozzle on the forward lower edge of the wiper.

Directly in advance of the wiper 13 and between opposite sides of the rectangular end of the central duct 16 and opposite ends of the plate 14, said plate is relieved slightly on its flat undersurface by providing longitudinally extending recesses 19 that increase the area of communication between opposite ends of the nozzle and the central duct 16, thus compensating for loss of suction power caused by the distance of the ends of the nozzle from the suction duct. The recessed portions 19 form a shallow, continuous and uninterrupted groove extending the full length of the plate and the flat undersurface of the plate forwardly of the wiper element 13 is unobstructed except for said groove.

To further equalize suction power caused by differences of distances between the edges of the elongated plate 14 and the suction duct 16, the entire forward edge 20 of the plate 14 is gradually advanced forwardly as it extends from its opposite ends toward its central portion. By referring to Figures 4 and 5, which show the nozzle tilted forwardly, it can be seen that while the most forward central portion of the forward edge 20 is in engagement with the floor, the remainder of said forward edge at opposite sides of the central portion gradually taper away from the floor as said edge extends to the ends of the plate 14 and further away from the duct 16. When in such position, the area of entrance of air under all edges of the plate 14 is substantially equal to the cross sectional area of the suction duct 16, thereby obtaining substantially uniform suction power along the forward and end edges of the plate that is approximately the same as the suction power through the duct.

The above-referred-to tilted position of the nozzle is used mostly when cleaning floors along baseboards and in corners where it is desired to concentrate suction power at areas where it is impossible to pass the wiper 13 over. Normally, the plate 14 assumes a substantially horizontal position, as shown in Figure 1, and is only tilted to extreme positions when it is desired to pass the forward edge 20 of the plate over large particles of rubbish or to increase suction at the ends of the plate.

Adjacent the rear end of the tube 12, a stud 21 is provided for attachment to or detachment from a swivel-type of airtight connector 22 on the lower end of a tubular handle 23.

In Figure 7, there is illustrated a slightly modified form wherein the recesses 19 that extended from the suction duct 16 to the ends of the plate 14 have been omitted, and with the exception of the duct 16 opening to the undersurface of the plate 14, there are no deviations from a smooth, flat surface on the underside of the plate in advance of the wiper 13.

In view of the foregoing description, taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

A nozzle for suction cleaners comprising a transversely elongated and substantially rectangular plate having a substantially flat unobstructed undersurface and a suction duct opening to said flat undersurface substantially midway of its length and between its forward and rear edges, and a wiper element extending the full length of said plate in rear of said suction duct, said wiper element being secured to and fixed against vertical movement relative to said plate, said wiper element projecting below the flat undersurface of said plate and being of a material of sufficient stiffness that it rockably supports said plate for movement of its forward edge towards and away from a floor surface engaged by said wiper element, said wiper element constituting the sole floor contacting support for said nozzle, said plate having a portion of its undersurface recessed along the full length thereof directly in advance of said wiper element and communicating centrally thereof with said suction duct, said recessed portion defining a shallow, continuous and uninterrupted groove extending from each end of said plate to said central duct and said undersurface being flat and unobstructed forwardly of said wiper element except for said recessed portion, said plate also having the intermediate portion of its forward edge gradually advanced forwardly of both end portions thereof so as to restrict the entrance of air under said intermediate portion upon tilting said plate on said wiper element and in a direction to move said forward edge towards the floor surface.

References Cited in the file of this patent

UNITED STATES PATENTS

| | | |
|---|---|---|
| 1,088,880 | Clements | Mar. 3, 1914 |
| 1,404,889 | Owen | Jan. 31, 1922 |
| 1,936,369 | Riebel | Nov. 21, 1933 |
| 2,205,877 | Dunbar | June 25, 1940 |
| 2,310,554 | Seyfried | Feb. 9, 1943 |
| 2,314,081 | Dow et al. | Mar. 16, 1943 |
| 2,591,262 | Humphrey | Apr. 1, 1952 |
| 2,629,126 | Brown | Feb. 24, 1953 |
| 2,655,682 | McCarthy | Oct. 20, 1953 |
| 2,658,228 | Meyerhoefer | Nov. 10, 1953 |

FOREIGN PATENTS

| | | |
|---|---|---|
| 511,645 | Germany | Oct. 31, 1930 |